(12) United States Patent
Yue et al.

(10) Patent No.: US 11,724,835 B2
(45) Date of Patent: Aug. 15, 2023

(54) LOCKING AND SEPARATING MECHANISM CAPABLE OF ACHIEVING SEQUENTIAL RELEASE OF MULTIPLE SATELLITES AND WORKING METHOD THEREOF

(71) Applicant: Harbin Institute of Technology, Harbin (CN)

(72) Inventors: Honghao Yue, Harbin (CN); Fei Yang, Harbin (CN); Huaiyu Li, Harbin (CN); Yifan Lu, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 297 days.

(21) Appl. No.: 17/137,495

(22) Filed: Dec. 30, 2020

(65) Prior Publication Data

US 2021/0114752 A1  Apr. 22, 2021

(30) Foreign Application Priority Data

Sep. 30, 2020  (CN) .......................... 202011060182.3

(51) Int. Cl.
| | | |
|---|---|---|
| *B64G 1/64* | (2006.01) | |
| *B64G 1/00* | (2006.01) | |
| *B64G 1/22* | (2006.01) | |

(52) U.S. Cl.
CPC ............. *B64G 1/641* (2013.01); *B64G 1/002* (2013.01); *B64G 1/222* (2013.01); *B64G 1/645* (2013.01)

(58) Field of Classification Search
CPC ........ B64G 1/641; B64G 1/002; B64G 1/222; B64G 1/645; B64G 1/10
See application file for complete search history.

(56) References Cited

U.S. PATENT DOCUMENTS

| | | | | |
|---|---|---|---|---|
| 5,129,601 A | * | 7/1992 | Henkel ................... | B64G 1/222 124/1 |
| 9,718,566 B2 | * | 8/2017 | Field ...................... | B64G 1/641 |

(Continued)

*Primary Examiner* — Medhat Badawi
*Assistant Examiner* — Vicente Rodriguez
(74) *Attorney, Agent, or Firm* — IPro, PLLC (57) ABSTRACT

The disclosure provides a locking and separating mechanism capable of achieving sequential release of multiple satellites and a working method thereof. The locking and separating mechanism includes a satellite group, two sets of locking assemblies and two sets of separating assemblies, wherein the satellite group includes a plurality of satellite bodies, the locking assemblies are located above the satellite group, the locking assemblies are connected with a base, the two sets of locking assemblies are arranged symmetrically at the diagonal line of the satellite group, the two sets of separating assemblies are arranged symmetrically on the two opposite sides of the satellite group, the bottom parts of the separating assemblies are fixedly connected with the base, and the inner sides of the separating assemblies are connected with the satellite group; the separating assemblies include sliding rails, a plurality of sliding blocks, redundant steel wire ropes, fixed pulleys A, pulley support seats A, fixed pulleys B, separating motors and pulley support seats B; the plurality of sliding blocks are matched with the sliding rails, the sliding blocks are arranged in one-to-one correspondence with spherical structures on the satellite bodies, the locking assemblies compress the satellite group, and the separating assemblies separate the satellite bodies one by one. The mechanism is simple in structure, low in energy consumption, and convenient to install and store, and can achieve separation of multiple satellites one by one.

11 Claims, 5 Drawing Sheets

(56) References Cited

U.S. PATENT DOCUMENTS

| | | | |
|---|---|---|---|
| 9,796,488 B2* | 10/2017 | Cook | B64G 1/646 |
| 11,267,591 B2* | 3/2022 | Holemans | B64G 1/641 |
| 2011/0287653 A1* | 11/2011 | Youtsey | H01R 13/193 |
| | | | 439/345 |

* cited by examiner

LOCKING AND SEPARATING MECHANISM CAPABLE OF ACHIEVING SEQUENTIAL RELEASE OF MULTIPLE SATELLITES AND WORKING METHOD THEREOF

TECHNICAL FIELD

The disclosure belongs to the technical field of aerospace, and particularly relates to a locking and separating mechanism capable of achieving sequential release of multiple satellites and a working method thereof.

BACKGROUND

In recent years, with the development of micro-nano technology and integrated comprehensive electronic technology and the innovation of satellite design ideas, satellite miniaturization becomes an inevitable trend in future satellite development. When the novel CubeSat carries a certain load, the mass and volume of the CubeSat are smaller than those of satellites in other shapes. The traditional satellite locking and separating mechanism mostly uses pyrotechnic mechanisms, the huge impact force generated by the pyrotechnic mechanisms such as explosive bolts in the release process can cause huge impact damage to a micro-satellite, and at the same time, pyrotechnics have high requirements for the storage environment, and the space environment can be polluted. Especially in recent years, the launching method of multiple satellites with one rocket gradually develops in the aerospace field, the traditional satellite locking and separating mechanism is no longer applicable, and therefore, it is necessary to design a locking and separating mechanism suitable for multiple satellites.

SUMMARY

In view of this, the disclosure aims to propose a locking and separating mechanism capable of achieving sequential release of multiple satellites and a working method thereof, wherein the mechanism is simple in structure, low in energy consumption, and convenient to install and store, and can achieve separation of multiple satellites one by one.

In order to achieve the above purpose, the technical scheme of the disclosure is implemented as follows:

A locking and separating mechanism capable of achieving sequential release of multiple satellites includes a satellite group, two sets of locking assemblies and two sets of separating assemblies, wherein the satellite group includes a plurality of satellite bodies, the locking assemblies are located above the satellite group, the locking assemblies are connected with a base, the two sets of locking assemblies are arranged symmetrically at a diagonal line of the satellite group, the two sets of separating assemblies are arranged symmetrically on two opposite sides of the satellite group, bottom parts of the separating assemblies are fixedly connected with the base, and inner sides of the separating assemblies are connected with the satellite group; and the locking assemblies compress the satellite group, and the separating assemblies separate the satellite bodies one by one.

Further, the satellite group further includes a carrying platform, a plurality of satellite bearing rods and a plurality of anti-shear cone pins, wherein the carrying platform is fixed to the base, a plurality of pin holes are evenly distributed in an upper end surface of each of the satellite bodies, the plurality of anti-shear cone pins are evenly distributed on a lower end surface of each of the satellite bodies, and the anti-shear cone pins on the lower end surface of the previous satellite body are matched with the pin holes in the upper end surface of the next satellite body one to one; and hole sites fixedly connected with the satellite bearing rods are arranged at each corner of each of the satellite bodies, and spherical structures connected with the separating assemblies are fixedly connected with a periphery of each of the satellite bodies.

A plurality of pin holes are formed in the carrying platform, and the satellite body on a lowest layer is positioned on the carrying platform through the anti-shear cone pins; and the satellite bearing rods have upper ends of cylindrical structures with variable diameters and lower ends of cylindrical tube structures with variable diameters, and both upper and lower satellite bodies are connected through the cooperation of the satellite bearing rods.

Further, the satellite body is in a quadrangular prism configuration or a hexagonal prism configuration.

Further, four pin holes are evenly distributed in the upper end surface of each of the satellite bodies, four anti-shear cone pins are evenly distributed on the lower end surface of each of the satellite bodies, and four pin holes are formed in the carrying platform.

Further, the locking assembly includes a locking support seat, a locking rotating shaft, a locking motor and a compression plate, wherein the locking support seat is fixedly connected to a column, the column is fixed to the carrying platform, the locking motor is installed on the locking support seat, the locking rotating shaft is installed in the locking support seat, a motor shaft of the locking motor drives the locking rotating shaft to rotate, one end of the compression plate is fixed to the locking rotating shaft, and the locking motor drives the compression plate to compress the topmost satellite bearing rod through the locking rotating shaft.

Further, the separating assembly includes a sliding rail, a plurality of sliding blocks, a plurality of steel wire ropes, a fixed pulley A, a pulley support seat A, a fixed pulley B, a separating motor and a pulley support seat B; a bottom end of the sliding rail is fixed to the carrying platform, the plurality of sliding blocks are matched with the sliding rail, the sliding blocks are arranged in one-to-one correspondence with the spherical structures on the satellite bodies, the fixed pulley A is installed on the base through the pulley support seat A, the fixed pulley B is fixed to the carrying platform through the pulley support seat B, the fixed pulley A is arranged above the sliding rail, the fixed pulley B is arranged on a lower part of a side of the sliding rail, the plurality of steel wire ropes are arranged to bypass the fixed pulley B and the fixed pulley A, each of the sliding blocks is connected with one steel wire rope, and the fixed pulley B is driven by the separating motor.

Further, a cross section of the sliding rail is an isosceles trapezoid to provide movement rails for the sliding block; one end of the sliding block is of a quadrangular prism structure, a trapezoidal opening is formed in the sliding block, the sliding block slides up and down on the sliding rail, the other end of the sliding block is of a hemispherical socket structure, and the hemispherical socket structure is matched with the spherical structure of the satellite group.

Each of all the steel wire ropes has one end fixedly connected with a quadrangular prism structure end of the corresponding sliding block, the other end fixedly connected with the fixed pulley B, and a middle part placed on the fixed pulley A; and the steel wire ropes are redundant steel wire ropes.

Further, the fixed pulley A is installed on the pulley support seat A through a pulley shaft A; two sleeves A are symmetrically arranged on the pulley shaft A on both sides of the fixed pulley A, and the two sleeves A provide axial positioning for the fixed pulley A; and the pulley support seat A is fixedly connected to the base.

Further, the fixed pulley B is installed on the pulley support seat B through a pulley shaft B; two sleeves B are symmetrically arranged on the pulley shaft B on both sides of the fixed pulley B, and the two sleeves B provide axial positioning for the fixed pulley B; and the pulley support seat B is fixedly connected to the carrying platform.

A working method of a locking and separating mechanism capable of achieving sequential release of multiple satellites includes the following steps:

1) A Locked State before and during launch of satellites with a rocket, a system being in a locked state, through cooperation of cylindrical structures with variable diameters at upper ends of satellite bearing rods of a satellite body below with cylindrical tube structures with variable diameters at lower ends of satellite bearing rods of a satellite body above, bearing main axial loads and transverse shear force by the satellite bearing rods at corners of satellites to achieve limitation of five degrees of freedom; and bearing remaining transverse shear force by anti-shear cone pins on bottom surfaces of the satellite bodies, and finally achieving positioning of the last degree of freedom and overall compression through compression of compression plates; and 2) A Separation Process when the satellites reach predetermined orbits with the rocket, receiving a separation signal by the locking and separating mechanism, and rotating locking motors to drive locking rotating shafts to rotate, so that the compression plates are driven to rotate outwards to release compression on the satellite bodies and restrictions on a degree of freedom of longitudinal movement;

then rotating separating motors to drive pulley shafts B to rotate and thus drive fixed pulleys B to rotate, so as to drive steel wire ropes to move around fixed pulleys A and thus drive sliding blocks fixedly connected with the steel wire ropes to slide upwards along sliding rails, and through the cooperation of hemispherical socket structures and spherical structures, driving the satellite bodies to move upwards to achieve separation; and moreover, after the first satellite body is separated, during a continuous rotation process of the separating motors, separating the satellite bodies one by one under actions of the sliding blocks and the redundant steel wire ropes.

Compared with the prior art, the locking and separating mechanism capable of achieving sequential release of multiple satellites and the working method thereof according to the disclosure have the following advantages:

1) The satellite bearing rods at four corners and the four anti-shear cone pins on the ground are all centrally symmetrical, so that the upper and lower satellites can be arranged symmetrically at 90 degrees, solar wings of adjacent satellites are arranged in a staggered mode, this arrangement method avoids mutual interference between solar wing faces of the satellites, and the carrying space is saved.

2) The layout of each assembly is compact, the size of the mechanism is small, the installation space is small, and the mechanism can be applied to satellites of different shapes and quantities.

3) The steel wire ropes are used to drive the sliding blocks to slide on the sliding rails, then a hemispherical socket-spherical boss mechanism drives the satellites to separate, separation of the satellites one by one can be achieved, and separation time of each satellite can be controlled by controlling the separating motors.

4) The satellite bearing rods are designed to be of the cylindrical structures with variable diameters at the upper ends and the hollow cylindrical tube structures at the lower ends, the upper end of one bearing rod can be matched with the lower end of the other bearing rod, and configuration and assembly between the satellites can be completed through the cooperation of the bearing rods.

5) Bearing rod structures of the satellites solve problems about positioning and cooperation during assembly between the satellites, and at the same time, the bearing rods resist most of the transverse shear force borne by the satellites, so that the satellites are protected.

6) By adopting a double anti-shear structure of the anti-shear cone pins and the satellite bearing rods, the possibility of damage to the satellites by the transverse shear force in a launch process is effectively reduced.

BRIEF DESCRIPTION OF FIGURES

Drawings constituting a part of the disclosure are used to provide a further understanding of the disclosure. The exemplary embodiments of the disclosure and description thereof are used to explain the disclosure, and do not constitute an improper limitation to the disclosure. In the drawings.

DESCRIPTION OF REFERENCE NUMERALS

1—satellite group, 1-1—carrying platform, 1-2—satellite body, 1-3—satellite bearing rod, 1-4—anti-shear cone pin, 1-5—spherical structure, 2—locking assembly, 2-1—locking support seat, 2-2—locking rotating shaft, 2-3—locking motor, 2-4—compression plate, 3—separating assembly, 3-1—sliding rail, 3-2—sliding block, 3-3—steel wire rope, 3-4—fixed pulley A, 3-5—pulley shaft A, 3-6—sleeve A, 3-7—pulley support seat A, 3-8—fixed pulley B, 3-9—separating motor, 3-10—pulley shaft B, 3-11—sleeve B, and 3-12—pulley support seat B.

DETAILED DESCRIPTION

It should be noted that the embodiments and characteristics in the embodiments of the disclosure can be combined with each other if there is no conflict.

Hereinafter, the disclosure will be described in detail with reference to accompanying drawings and in combination with the embodiments.

As shown in FIG. 1 to FIG. 7, a locking and separating mechanism capable of achieving sequential release of multiple satellites includes a satellite group 1, two sets of locking assemblies 2 and two sets of separating assemblies 3. The satellite group 1 includes a plurality of satellite bodies 1-2. The locking assemblies 2 are located above the satellite group 1. The locking assemblies 2 are connected with a base 4. The two sets of locking assemblies 2 are arranged symmetrically at a diagonal line of the satellite group 1. The two sets of separating assemblies 3 are arranged symmetrically on two opposite sides of the satellite group 1. Bottom parts of the separating assemblies 3 are fixedly connected with the base 4, and inner sides 5 of the separating assemblies 3 are connected with hemispherical socket structures and spherical structures on the satellite group through sliding blocks. The locking assemblies compress the satellite group 1, and the separating assemblies 3 separate the satellite bodies 1-2 one by one.

Figure 1:
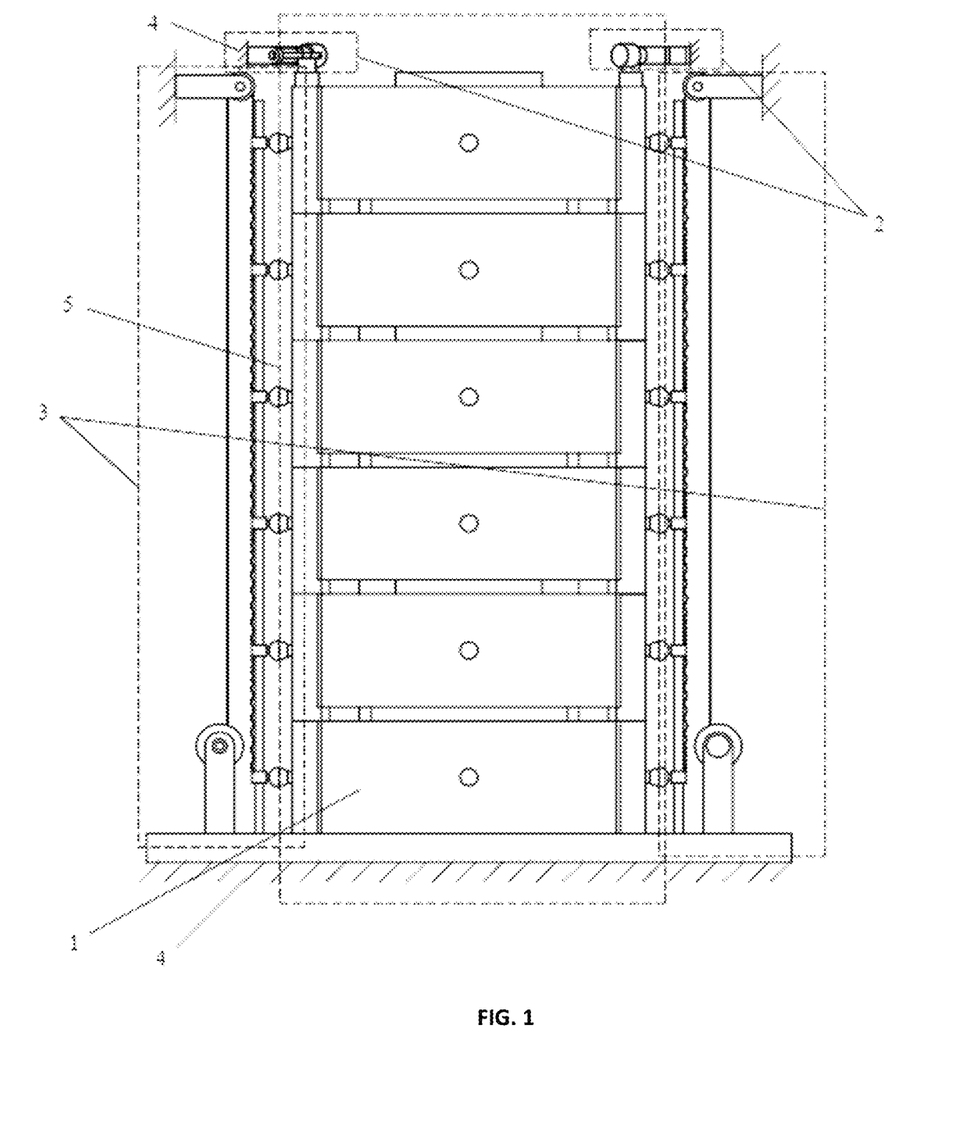
FIG. 1 is a front view of a locking and separating mechanism capable of achieving sequential release of multiple satellites according to an embodiment of the disclosure.
Figure 2:
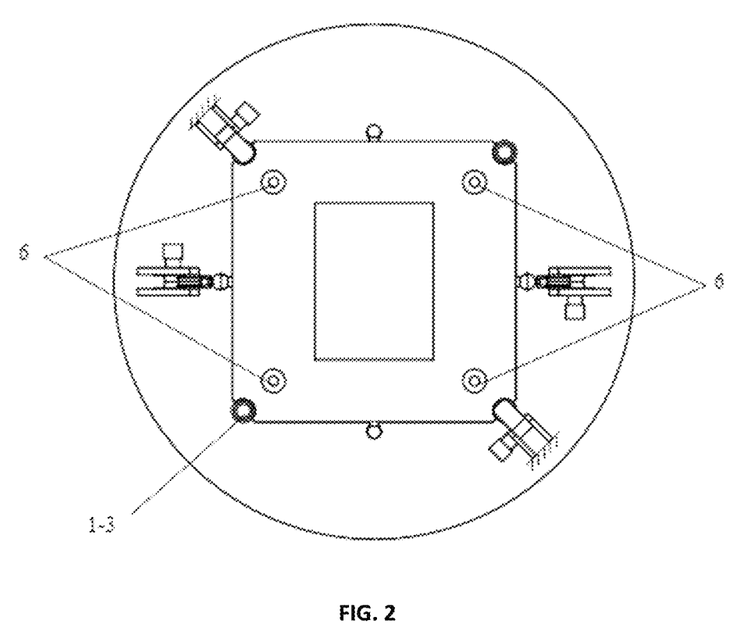
FIG. 2 is a top view of the locking and separating mechanism capable of achieving sequential release of multiple satellites according to the embodiment of the disclosure.
Figure 3:
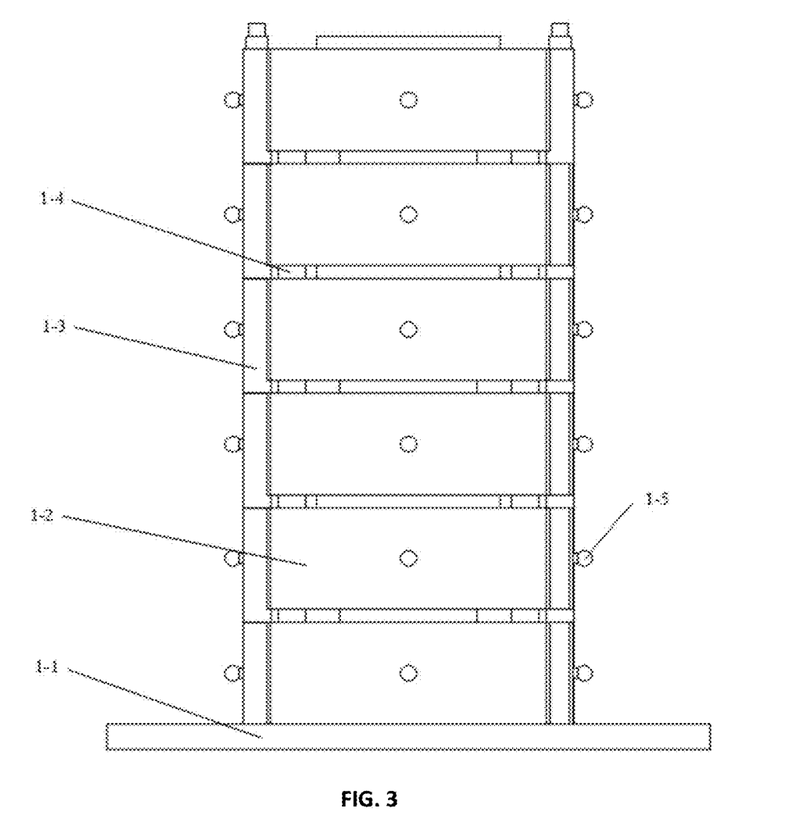
FIG. 3 is a schematic diagram of a satellite group in the locking and separating mechanism capable of achieving sequential release of multiple satellites according to the embodiment of the disclosure.

The satellite group 1 further includes a carrying platform 1-1, a plurality of satellite bearing rods 1-3 and a plurality of anti-shear cone pins 1-4. The carrying platform is fixed to the base 4. A plurality of pin holes 6 are evenly distributed in an upper end surface of each of the satellite bodies. The plurality of anti-shear cone pins 1~4 are evenly distributed on a lower end surface of each of the satellite bodies. The anti-shear cone pins on the lower end surface of the previous satellite body are matched with the pin holes 6 on the upper end surface of the next satellite body one to one. Hole sites fixedly connected with the satellite bearing rods 1-3 are arranged at each corner of each of the satellite bodies 1-2, and spherical structures 1-5 connected with the separating assemblies 3 are fixedly connected with a periphery of each of the satellite bodies 1-2.

A plurality of pin holes 6 are formed in the carrying platform 1-1, and the satellite body on a lowest layer is positioned on the carrying platform 1-1 through the anti-shear cone pins 1-4. The satellite bearing rods 1-3 have upper ends of cylindrical structures with variable diameters lower ends of cylindrical tube structures with variable diameters, and both upper and lower satellite bodies are connected through the cooperation of the satellite bearing rods.

The satellite body 1-2 is in a quadrangular prism configuration or a hexagonal prism configuration.

Four pin holes 6 are evenly distributed in the upper end surface of each of the satellite bodies 1-2, four anti-shear cone pins 1~4 are evenly distributed on the lower end surface of each of the satellite bodies 1-2, and four pin holes 6 are formed in the carrying platform 1-1.

Figure 4:
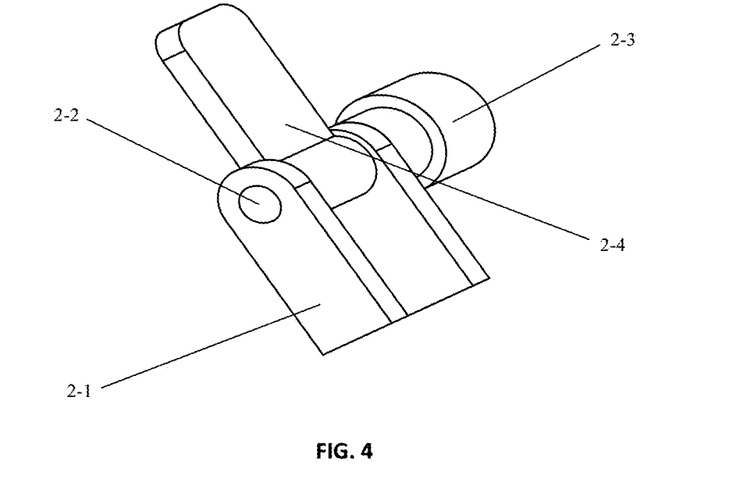
FIG. 4 is a schematic diagram of a locking assembly in the locking and separating mechanism capable of achieving sequential release of multiple satellites according to the embodiment of the disclosure.

The locking assembly 2 includes a locking support seat 2-1, a locking rotating shaft 2-2, a locking motor 2-3 and a compression plate 2-4. The locking support seat 2-1 is fixedly connected to a column. The column is fixed to the carrying platform 1-1. The locking motor 2-3 is installed on the locking support seat 2-1. The locking rotating shaft 2-2 is installed in the locking support seat 2-1. A motor shaft of the locking motor 2-3 drives the locking rotating shaft 2-2 to rotate. One end of the compression plate 2-4 is fixed to the locking rotating shaft 2-2. The locking motor 2-3 drives the compression plate 2-4 to compress the topmost satellite bearing rod 1-3 through the locking rotating shaft 2-2, and the locking rotating shaft 2-2 provides a force transferring path for the locking motor 2-3 to drive the compression plate 2-4. The compression plate 2-4 is a terminal mechanism compressing the topmost satellite bearing rod 1-3.

Figure 5:
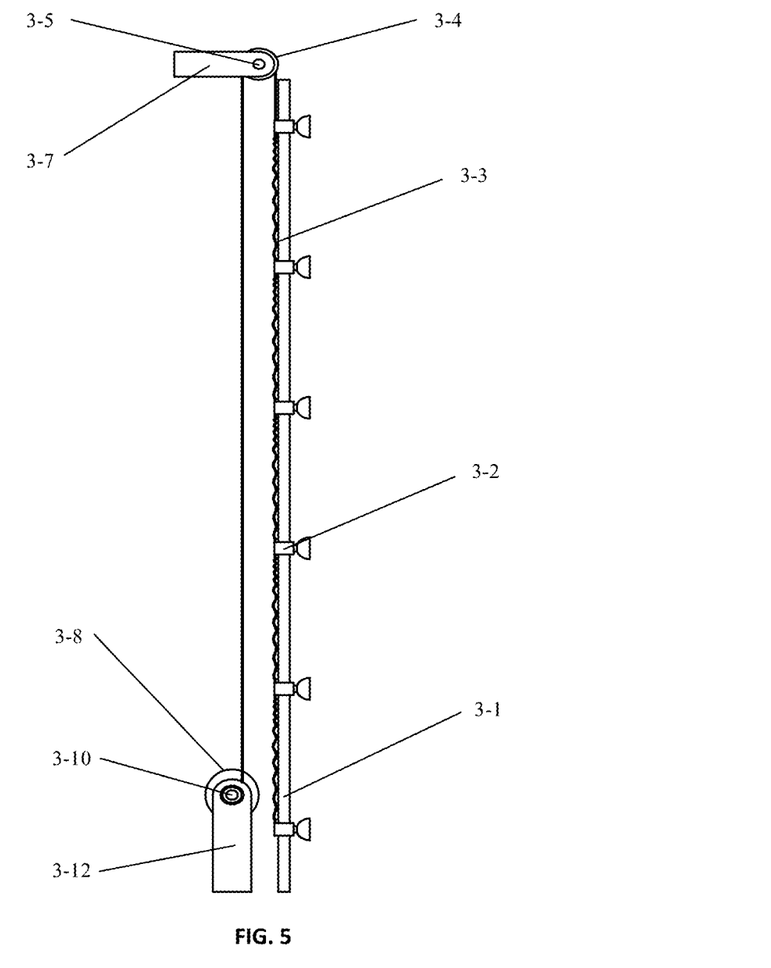
FIG. 5 is a schematic diagram of a separating assembly in the locking and separating mechanism capable of achieving sequential release of multiple satellites according to the embodiment of the disclosure.

The separating assembly 3 includes a sliding rail 3-1, a plurality of sliding blocks 3-2, a plurality of steel wire ropes 3-3, a fixed pulley A 3-4, a pulley support seat A 3-7, a fixed pulley B 3-8, a separating motor 3-9 and a pulley support seat B 3-12. A bottom end of the sliding rail 3-1 is fixed to the carrying platform 1-1. The plurality of sliding blocks 3-2 are matched with the sliding rail 3-1. The sliding blocks 3-2 are arranged in one-to-one correspondence with the spherical structures 1-5 on the satellite bodies. The fixed pulley A 3-4 is installed on the base 4 through the pulley support seat A 3-7. The fixed pulley B 3-8 is fixed to the carrying platform 1-1 through the pulley support seat B 3-12. The fixed pulley A 3-4 is arranged above the sliding rail 3-1. The fixed pulley B 3-8 is arranged on a lower part of a side of the sliding rail 3-1. The plurality of steel wire ropes 3-3 are arranged to bypass the fixed pulley B 3-8 and the fixed pulley A 3-4 in sequence. Each of the sliding blocks 3-2 is connected with one steel wire rope 3-3, and the fixed pulley B 3-8 is driven by the separating motor 3-9.

A cross section of the sliding rail 3-1 is an isosceles trapezoid to provide movement rails for the sliding block 3-2. One end of the sliding block 3-2 is of a quadrangular prism structure. A trapezoidal opening is formed in the sliding block. The sliding block slides up and down on the sliding rail 3-1, the other end of the sliding block 3-2 is of a hemispherical socket structure, and the hemispherical socket structure is matched with the spherical structure 1-5 of the satellite group 1.

Each of all the steel wire rope 3-3 has one end fixedly connected with a quadrangular prism structure end of the corresponding sliding block 3-2, the other end fixedly connected with the fixed pulley B 3-8, and a middle part placed on the fixed pulley A 3-4. The steel wire ropes 3-3 are redundant steel wire ropes.

Figure 6:
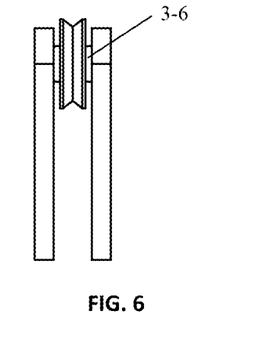
FIG. 6 is a schematic diagram of a fixed pulley A and related parts thereof in the separating assembly of the locking and separating mechanism capable of achieving sequential release of multiple satellites according to the embodiment of the disclosure.

The fixed pulley A 3-4 is installed on the pulley support seat A 3-7 through a pulley shaft A 3-5 to provide support for the steel wire ropes. Two sleeves A 3-6 are symmetrically arranged on the pulley shaft A 3-5 on both sides of the fixed pulley A 3-4, and the two sleeves A 3-6 provide axial positioning for the fixed pulley A 3-4. The pulley support seat A 3-7 is fixedly connected with the base 4 to provide support for the fixed pulley A 3-4.

Figure 7:
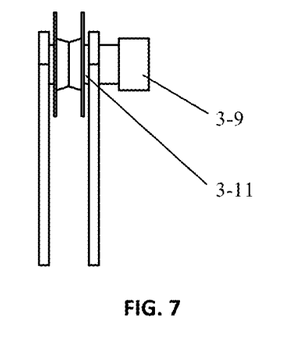
FIG. 7 is a schematic diagram of a fixed pulley B and related parts thereof in the separating assembly of the locking and separating mechanism capable of achieving sequential release of multiple satellites according to the embodiment of the disclosure.

The fixed pulley B 3-8 is installed on the pulley support seat B 3-12 through a pulley shaft B 3-10 and is connected with the separating motor 3-9 through the pulley shaft B 3-10. Two sleeves B 3-11 are symmetrically arranged on the pulley shaft B 3-10 on both sides of the fixed pulley B 3-8, and the two sleeves B 3-11 provide axial positioning for the fixed pulley B 3-8. The pulley support seat B 3-12 are fixedly connected with the carrying platform 1-1 to provide support for the fixed pulley B 3-8.

A working method of a locking and separating mechanism capable of achieving sequential release of multiple satellites includes the following steps.

1) A Locked State

Before and during launch of satellites with a rocket, a system is in a locked state. Through cooperation of cylindrical structures with variable diameters at upper ends of satellite bearing rods 1-3 of a satellite body 1-2 below with cylindrical tube structures with variable diameters at lower ends of satellite bearing rods 1-3 of a satellite body 1-2 above, the satellite bearing rods 1-3 at corners of satellites bear main axial loads and transverse shear force to achieve limitation of five degrees of freedom. Four anti-shear cone pins 1~4 on bottom surfaces of the satellite bodies 1-2 bear remaining transverse shear force, and finally compression of compression plates 2-4 achieves positioning of the last degree of freedom and overall compression.

2) A Separation Process

When the satellites reach predetermined orbits with the rocket, the locking and separating mechanism receives a separation signal, and locking motors 2-3 rotate to drive locking rotating shafts 2-2 to rotate, so that the compression plates 2-4 are driven to rotate outwards to release compression on the satellite bodies 1-2 and restrictions on a degree of freedom of longitudinal movement.

Then the separating motors 3-9 rotate to drive pulley shafts B 3-10 to rotate and thus drive fixed pulleys B 3-8 to rotate, so as to drive steel wire ropes 3-3 to move around fixed pulleys A 3-4 and thus drive sliding blocks 3-2 fixedly connected with the steel wire ropes 3-3 to slide upwards along sliding rails 3-1. Through the cooperation of hemispherical socket structures and spherical structures, the satellite bodies 1-2 are driven to move upwards to achieve separation.

Moreover, after the first satellite body is separated, during a continuous rotation process of the separating motors 3-9, the satellite bodies 1-2 are separated one by one under combined actions of the sliding blocks 3-2 and the redundant steel wire ropes 3-3.

The locking and separating mechanism for multiple satellites is installed in a cabin of a rocket before launch. Before take-off and in a launch process, the mechanism locks the satellite group, after arriving at a predetermined orbit in space, the mechanism is unlocked by a command to release the satellite group, and then the satellites are separated one by one under the action of the fixed pulleys driving the sliding blocks and the hemispherical sockets to move to achieve an effect of releasing the satellites.

The above descriptions are only exemplary embodiments of the disclosure and are not intended to limit the disclosure. Any modification, equivalent replacement, improvement, etc. within the spirits and principles of the disclosure shall be included in the scope of protection of the disclosure.

What is claimed is:

1. A locking and separating mechanism, comprising a satellite group, two sets of locking assemblies and two sets of separating assemblies, wherein the satellite group comprises a plurality of satellite bodies, the locking assemblies are located above the satellite group, the locking assemblies are connected with a base, the locking assemblies are arranged symmetrically at a diagonal line of the satellite group, the separating assemblies are arranged symmetrically on two opposite sides of the satellite group, bottom parts of the separating assemblies are connected with the base, and inner sides of the separating assemblies are connected with the satellite group, and the locking assemblies are configured to compress the satellite group, and the separating assemblies are configured to separate the satellite bodies one by one;

wherein the satellite group further comprises a carrying platform connected to the base, a plurality of satellite bearing rods, a plurality of pin holes evenly distributed in an upper end surface of each of the satellite bodies, a plurality of anti-shear cone pins evenly distributed on a lower end surface of each of the satellite bodies, hole sites connected with the satellite bearing rods at corners of each of the satellite bodies, and spherical structures at a periphery of each of the satellite bodies and connected with the separating assemblies;

wherein the anti-shear cone pins and the pin holes respectively of two neighboring satellite bodies among the satellite bodies engage;

wherein the satellite bearing rods have upper ends of cylindrical structures with varied diameters and lower ends of cylindrical tube structures with varied diameters.

2. The locking and separating mechanism according to claim 1, wherein the satellite bodies are in a quadrangular prism configuration or a hexagonal prism configuration.

3. The locking and separating mechanism according to claim 1, wherein the carrying platform comprises additional pin holes configured to engage some of the anti-shear cone pins.

4. The locking and separating mechanism according to claim 1, wherein each of the locking assemblies comprises a locking support seat, a locking rotating shaft, a locking motor and a compression plate, the locking support seat is connected to a column, the column is connected to the carrying platform, the locking motor is installed on the locking support seat, the locking rotating shaft is installed in the locking support seat, a motor shaft of the locking motor turns the locking rotating shaft, one end of the compression plate is connected to the locking rotating shaft, and the locking motor turns the compression plate through the locking rotating shaft.

5. The locking and separating mechanism according to claim 1, wherein each of the separating assemblies comprises a sliding rail, a plurality of sliding blocks, a plurality of steel wire ropes, a first pulley, a first pulley support seat, a second pulley, a separating motor and a second pulley support seat; wherein a bottom end of the sliding rail is connected to the carrying platform, the plurality of sliding blocks are matched with the sliding rail, the sliding blocks are arranged in one-to-one correspondence with the spherical structures on the satellite bodies, the first pulley is installed on the base through the first pulley support seat, the second pulley is connected to the carrying platform through the second pulley support seat, the first pulley is arranged above the sliding rail, the second pulley is arranged on a lower part of a side of the sliding rail, the plurality of steel wire ropes are arranged to bypass the second pulley and the first pulley in sequence, each of the sliding blocks is connected with one steel wire rope, and the second pulley is driven by the separating motor.

6. The locking and separating mechanism according to claim 5, wherein a cross section of the sliding rail is an isosceles trapezoid to provide movement rails for the sliding blocks; wherein one end of the sliding blocks is of a quadrangular prism structure, a trapezoidal opening is formed in the sliding blocks, the sliding blocks slide up and down on the sliding rail, the other end of the sliding blocks is of a hemispherical socket structure, and the hemispherical socket structure is matched with the spherical structure of the satellite group;

wherein each of the steel wire ropes has one end connected with a quadrangular prism structure end of the corresponding sliding block, the other end connected with the second pulley, and a middle part placed on the first pulley.

7. The locking and separating mechanism according to claim 5, wherein the first pulley is installed on the first pulley support seat through a first pulley shaft; wherein two first sleeves are symmetrically arranged on the first pulley shaft on both sides of the first pulley, and the two first sleeves provide axial positioning for the first pulley; and wherein the first pulley support seat is connected to the base.

8. The locking and separating mechanism according to claim 5, wherein the second pulley is installed on the second pulley support seat through a second pulley shaft; wherein two second sleeves are symmetrically arranged on the second pulley shaft on both sides of the second pulley, and the two second sleeves provide axial positioning for the second pulley; and wherein the second pulley support seat is connected to the carrying platform.

9. A method of using a locking and separating mechanism, wherein the locking and separating mechanism comprises a satellite group, two sets of locking assemblies and two sets of separating assemblies, wherein the satellite group comprises a plurality of satellite bodies, the locking assemblies are located above the satellite group, the locking assemblies are connected with a base, the locking assemblies are arranged symmetrically at a diagonal line of the satellite group, the separating assemblies are arranged symmetrically on two opposite sides of the satellite group, bottom parts of the separating assemblies are connected with the base, and inner sides of the separating assemblies are connected with the satellite group, and the locking assemblies are configured to compress the satellite group, and the separating assemblies are configured to separate the satellite bodies one by one;

wherein the satellite group further comprises a carrying platform connected to the base, a plurality of satellite bearing rods, a plurality of pin holes evenly distributed in an upper end surface of each of the satellite bodies, a plurality of anti-shear cone pins evenly distributed on a lower end surface of each of the satellite bodies, hole sites connected with the satellite bearing rods at corners of each of the satellite bodies, and spherical structures at a periphery of each of the satellite bodies and connected with the separating assemblies;

wherein the anti-shear cone pins and the pin holes respectively of two neighboring satellite bodies among the satellite bodies engage;

wherein the satellite bearing rods have upper ends of cylindrical structures with varied diameters and lower ends of cylindrical tube structures with varied diameters;

wherein each of the locking assemblies comprises a locking support seat, a locking rotating shaft, a locking motor and a compression plate, the locking support seat is connected to a column, the column is connected to the carrying platform, the locking motor is installed on the locking support seat, the locking rotating shaft is installed in the locking support seat, a motor shaft of the locking motor turns the locking rotating shaft, one end of the compression plate is connected to the locking rotating shaft, and the locking motor turns the compression plate through the locking rotating shaft;

wherein each of the separating assemblies comprises a sliding rail, a plurality of sliding blocks, a plurality of steel wire ropes, a first pulley, a first pulley support seat, a second pulley, a separating motor and a second pulley support seat; wherein a bottom end of the sliding rail is connected to the carrying platform, the plurality of sliding blocks are matched with the sliding rail, the sliding blocks are arranged in one-to-one correspondence with the spherical structures on the satellite bodies, the first pulley is installed on the base through the first pulley support seat, the second pulley is connected to the carrying platform through the second pulley support seat, the first pulley is arranged above the sliding rail, the second pulley is arranged on a lower part of a side of the sliding rail, the plurality of steel wire ropes are arranged to bypass the second pulley and the first pulley in sequence, each of the sliding blocks is connected with one steel wire rope, and the second pulley is driven by the separating motor;

wherein a cross section of the sliding rail is an isosceles trapezoid to provide movement rails for the sliding block; wherein one end of the sliding block is of a quadrangular prism structure, a trapezoidal opening is formed in the sliding block, the sliding block slides up and down on the sliding rail, the other end of the sliding block is of a hemispherical socket structure, and the hemispherical socket structure is matched with the spherical structure of the satellite group;

wherein each of the steel wire ropes has one end connected with a quadrangular prism structure end of the corresponding sliding block, the other end connected with the second pulley, and a middle part placed on the first pulley;

wherein the first pulley is installed on the first pulley support seat through a first pulley shaft; wherein two first sleeves are symmetrically arranged on the first pulley shaft on both sides of the first pulley, and the two first sleeves provide axial positioning for the first pulley; and wherein the first pulley support seat is connected to the base;

wherein the second pulley is installed on the second pulley support seat through a second pulley shaft; wherein two second sleeves are symmetrically arranged on the second pulley shaft on both sides of the second pulley, and the two second sleeves provide axial positioning for the second pulley; and wherein the second pulley support seat is connected to the carrying platform;

wherein the method comprises:

upon receiving a separation signal by the locking and separating mechanism, and using the locking motors to turn the locking rotating shafts, by which causing the compression plates to rotate outwards to release compression on the satellite bodies;

using the separating motors to turn the pulley shafts B and to turn the pulleys B, by which causing the steel wire ropes to move around the pulleys A and causing the sliding blocks to slide upwards along the sliding rails, through cooperation of the hemispherical socket structures and the spherical structures, and driving the satellite bodies to move upwards to achieve sequential separation of thereof.

10. The method according to claim 9, wherein the satellite bodies are in a quadrangular prism configuration or a hexagonal prism configuration.

11. The method according to claim 9, wherein the carrying platform comprises additional pin holes configured to engage some of the anti-shear cone pins.

* * * * *